H. H. HILL.
WHIFFLETREE-HOOK.
No. 190,489. Patented May 8, 1877.
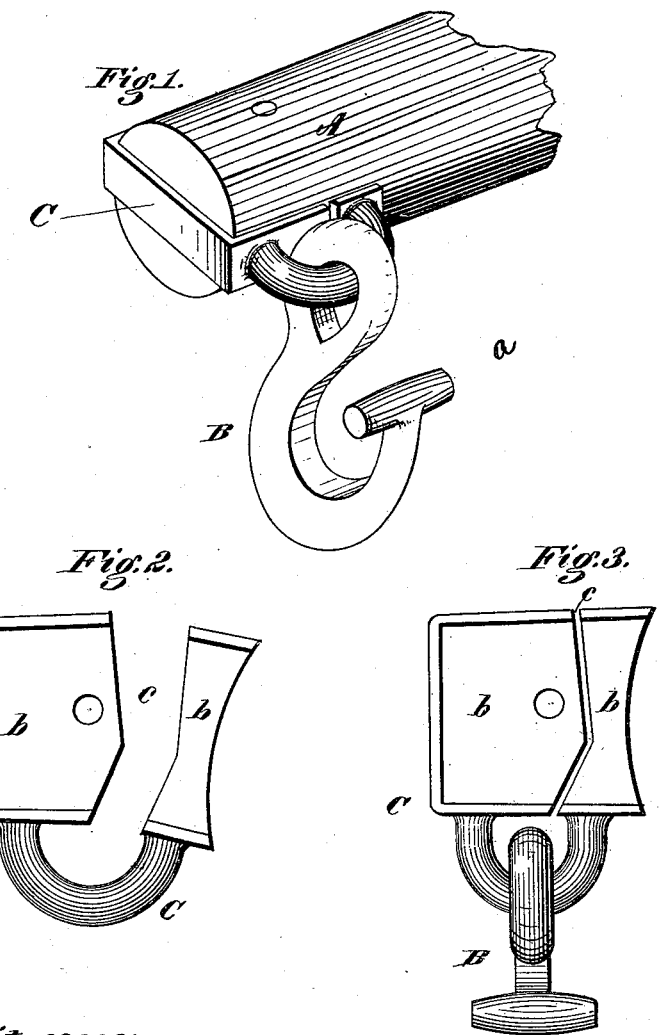

UNITED STATES PATENT OFFICE.

HENRY H. HILL, OF MOLINE, ILLINOIS.

IMPROVEMENT IN WHIFFLETREE-HOOKS.

Specification forming part of Letters Patent No. 190,489, dated May 8, 1877; application filed March 2, 1877.

*To all whom it may concern:*

Be it known that I, HENRY H. HILL, of Moline, in the county of Rock Island and State of Illinois, have invented certain Improvements in Trace-Hooks, of which the following is a specification:

The object of my invention is to provide a cheap and simple method of attaching loose trace-hooks to whiffletrees; and consists in the use of an eye or stirrup having a slotted web or flange, by which it is held to the whiffletree, and through which the end of the hook is slipped into position on the eye prior to the application of the latter to the whiffletree.

Figure 1 represents a perspective view of my complete device applied to a whiffletree; Fig. 2, a plan view of my eye-piece detached and opened to admit the hook; Fig. 3, a plan view of the hook and eye united.

A represents one end of the whiffletree; B, the trace-hook, and C the eye by which the hook is attached to the whiffletree.

As shown in the drawing, the hook is hung at its rear end loosely upon the eye, so that when released it will always hang in a pendent position. Across the point or nose of the hook there is formed a rigid bar or cross-piece, $a$, which stands in a horizontal position whenever the hook hangs down, as shown. By hanging the hook loosely and providing its nose with the cross-bar it is caused to retain the end of the trace securely under all circumstances, and when the animal is backing or turning as well as when advancing.

In order that the hook may be readily and securely attached to the eye C, the latter is provided with a flanged web, $b$, to enter a slit in the whiffletree, and the web provided with a slit, $c$, through which the loop or eye on the hook may be slipped into position on the main eye C, as shown. The slit $c$ may be made of the full width required for the admission of the end of the hook; or, when the eye is made of malleable iron, the slit may be made narrow and the web spread open, as shown in Fig. 2, to permit the insertion of the hook, and subsequently closed again, as shown in Fig. 3. When the web is driven into place in the single-tree the flanges embrace its opposite sides and hold the eye securely in place, at the same time preventing any possibility of the hook escaping through the slit in the web.

It is obvious that the form of the web and the slit and the nose of the hook may be modified without departing from the limit of my invention or changing their functions.

Having thus described my invention, what I claim is—

1. The combination of the whiffletree A, the hook B, and the eye C, provided with the web $b$ and slit $c$, substantially as shown.

2. The eye C, provided with a slotted or open web, $b$, through which the trace-hook may be slipped into place, substantially as shown and described.

HENRY H. HILL.

Witnesses:
 FRANK NOURSE,
 BENJ. W. HILL.